UNITED STATES PATENT OFFICE.

DAVID A. LEAHY, OF DETROIT, MICHIGAN, ASSIGNOR TO THE ALLYNE BRASS FOUNDRY COMPANY, OF DETROIT, MICHIGAN, A CORPORATION OF OHIO.

COMBINED VALVE AND DRAIN.

1,146,179.   Specification of Letters Patent.   Patented July 13, 1915.

Application filed May 13, 1914. Serial No. 838,189.

*To all whom it may concern:*

Be it known that I, DAVID A. LEAHY, a citizen of the United States, residing at Detroit, county of Wayne, State of Michigan, have invented a certain new and useful Improvement in Combined Valves and Drains, and declare the following to be a full, clear, and exact description of the same, such as will enable others skilled in the art to which it pertains to make and use the same, reference being had to the accompanying drawings, which form a part of this specification.

This invention relates to combined valves and drains and has for its object such a combined valve and drain as will effect the shutting off of the water in a building or other place and will, at the same time, drain the pipes of the building, without wetting the person operating the valve. It also provides means for conveying away the water drained.

Figure 1:
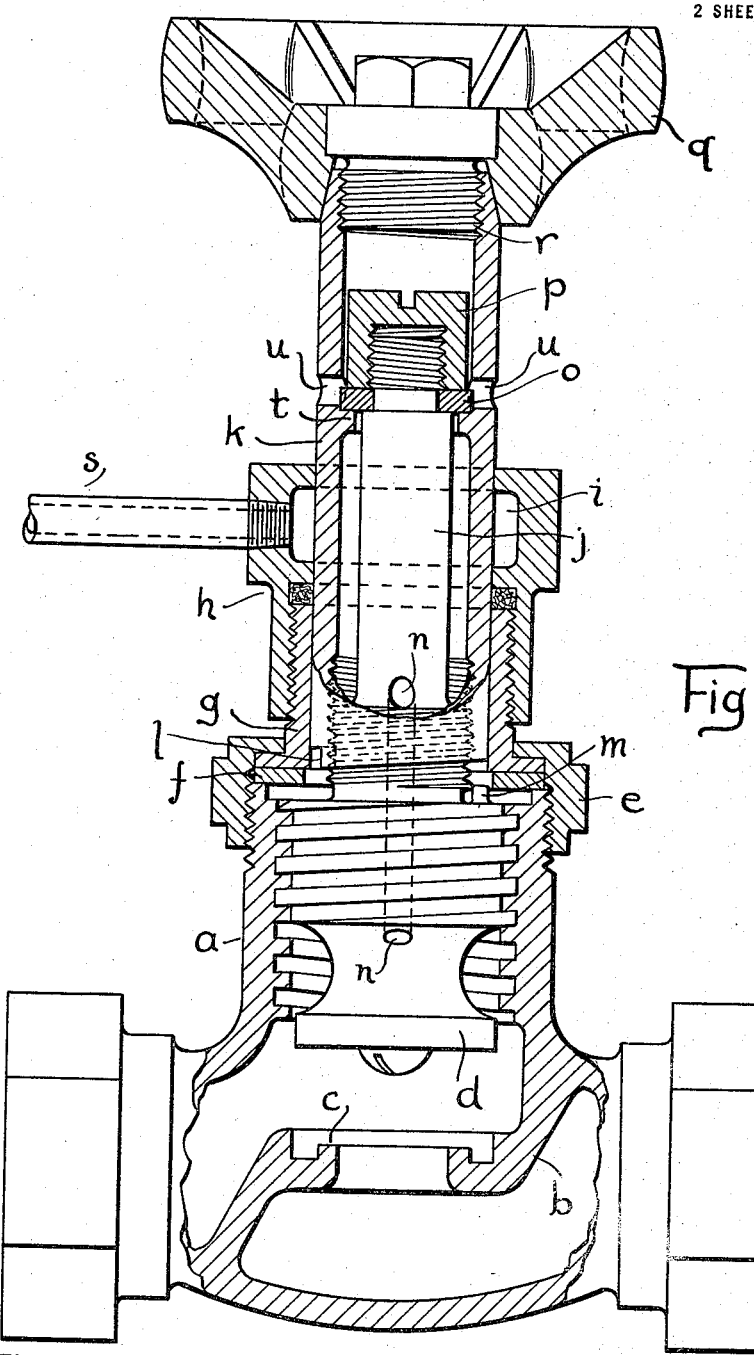
Figure 2:
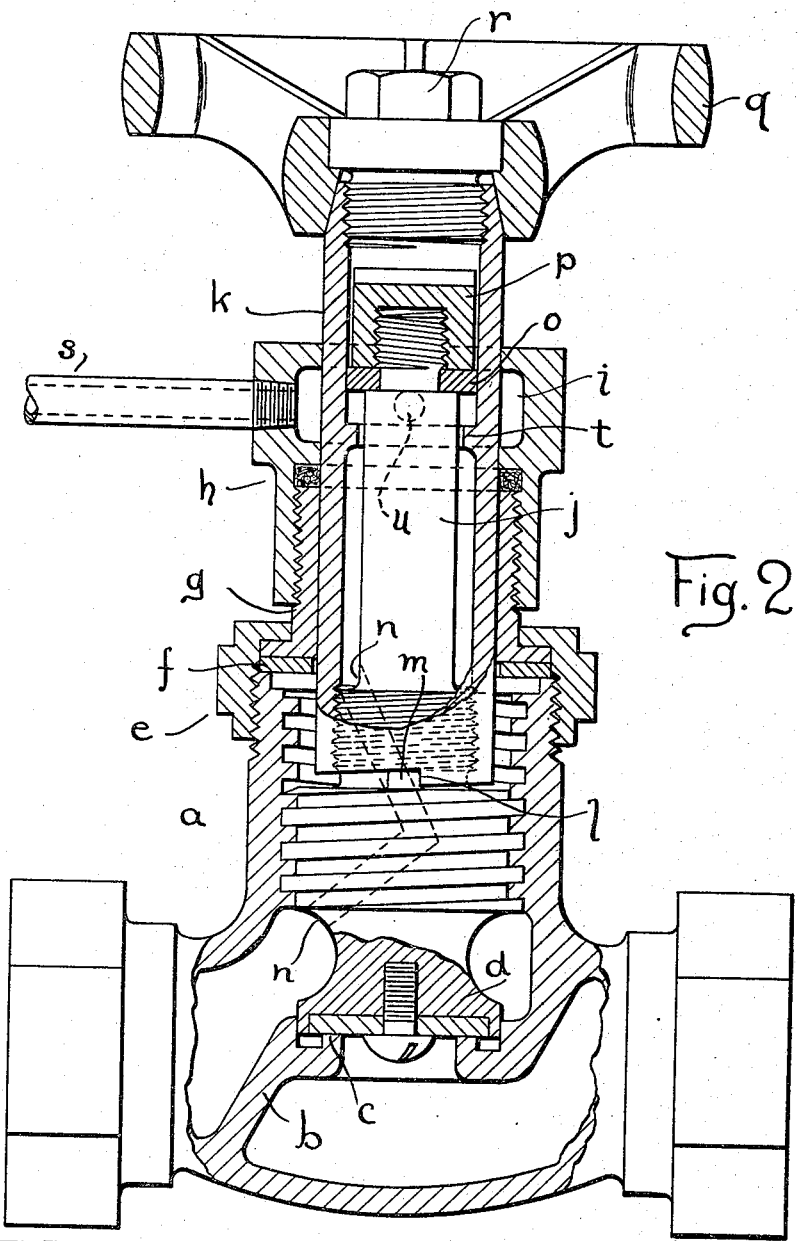

In the drawings,—Figure 1, is a vertical section of the combined valve and drain, the hollow shank of the hand-wheel being shown partly in elevation. Fig. 2, is a similar view showing the valve closed upon its seat.

*a* is a T or valve casing provided with a suitable partition *b* which forms a well-known form of valve seat in common use in faucets and globe valves. The valve seat *c* receives the valve *d* whose upper portion is provided with large screwthreads of a steep pitch. These screwthreads engage with the interiorly-threaded stem portion of the T. The outside of this portion is screwthreaded to receive the shouldered union nut *e* which, when run upon these threads, holds the packing ring *f* and the annularly flanged sleeve *g* against the end of the stem portion of the T. The sleeve *g* is externally threaded to receive the nut *h* whose upper portion is provided with an annular recess *i*.

The valve *d* is provided with a stem *j* whose lower end is threaded and upon these threads run the internal threads of the hollow shank *k*. The inner end of the hollow shank is provided with a shoulder *l* which may engage with a stop *m* on the upper end of the valve so that the two members will rotate together when the shank is run far enough on the threads of the valve stem to bring the shoulder and the stop into a common plane.

A passageway *n* leads through the valve and through the inner end of the valve stem and opens into the annular space between the reduced portion of the valve stem *j* and the hollow shank *k*. This annular space is cut off from the valve chamber or interior of the T by the threads of the valve stem engaging with the threads of the hollow shank and the threads of the valve engaging with the threads of the stem portion of the T.

The packing ring *o* is held against the shoulder formed by the reduction of the diameter of the outer end of the valve stem by means of a cap nut *p* which has a left-hand screw engagement with the end of the valve stem. The outer end of the hollow shank *k* is tapered on the outside and threaded on the inside. The hand-wheel *q* has a hub with a conical central opening; hence, when the screw *r* is turned onto the threads in the end of the hollow shank, the hand-wheel can be forced tightly upon the end of the shank by reason of the wedging action.

A pipe *s* is threaded into the nut *h* so as to communicate with the annular recess *i*. The hollow shank, more than half the distance outward, is provided with an internal ring *t*. Above this, in the position shown in Fig. 1, on either side is a perforation *u* leading to the outside of the hollow shank.

The operation of the combined valve and drain is as follows: The friction between the packing ring *o* and the ring *t* and the friction between the threads on the lower end of the valve stem and the internal threads of the hollow shank is greater than the friction of the large threads of the valve and the interior threads of the valve casing. Consequently the valve and the shank *k* rotate together when the hand-wheel *q* is turned from the position shown in Fig. 1. They rotate together until the valve *d* strikes its seat *c*. The seat *c* prevents further movement of the valve and consequently further turning of the hand-wheel causes the hollow shank to rotate independently of the valve stem *j* and valve *d*. The openings *u* which, when the valve is open, lie at a point outwardly of the packing ring now travel to a point forwardly of or inwardly below the packing ring *o*, but inasmuch as the packing ring *o* has already been brought inwardly within the outer end of the nut *h* when the openings *u* travel in beyond the packing they are within the annular recess *i* so that the discharge is directly into the annular recess *i* where it may be conveyed away by the pipe s to any convenient place of discharge. As the openings u do not draw away from the packing ring o until the valve closes upon its seat, no water except the residuum in the pipes of the building will be drained off. Further turning of the hollow shank brings the shoulder l against the stop m so as to give a positive interlock which will allow the tightening of the valve upon the valve seat in such a fashion that there is no danger of leakage.

In opening, the shank k turns alone until the ring t strikes the packing ring o. At this point the openings u are above the packing ring so that the packing ring shuts them off from the water coming through the passageway n and the annular space about the valve stem j. When the ring t strikes the packing ring o they bind and now the hollow shank k and the valve stem j rotate together to lift the valve d off the seat.

By means of the union nut e, the nut h with sleeve g can be set at any position within the 360 degrees of a circle without affecting the packings.

What I claim is:

1. A combined valve and drain, having in combination, a valve casing, a valve threaded thereinto to be screwed against its seat, a valve stem attached to the valve, and a hollow shank engaging about the valve stem, the outer end of the valve stem being arranged to at all times fit tightly with respect to the hollow shank and other portions of the shank and stem being spaced from each other, the said valve and valve stem being provided with a continuously open passageway therethrough for draining purposes, said passage-way emptying into the space between the hollow shank and the stem and at a point inwardly of the tightly fitting end of the valve stem, and said hollow shank being provided in its side with an opening which is at a point outwardly of the tightly fitting end of the stem when the valve is open and which communicates with that portion of the hollow interior of the shank into which the said passage-way empties only when the valve is closed upon its seat.

2. A combined valve and drain, having in combination, a valve casing, a valve threaded thereinto to screw upon its seat, a valve stem attached to the valve, said valve and valve stem provided with a passageway therethrough, and a hollow shank having a threaded connection with the valve stem and having a portion spaced therefrom, and communicating with said passageway, the end of the valve stem being provided with a packing ring that engages tightly with the interior of the shank, and said hollow shank provided with an opening in the side which lies adjacent to or to the outside of the packing ring when the valve is open, but which travels to the inside of the packing ring to communicate with the interior of the hollow shank by reason of relative movement of the shank and valve stem after the valve has reached its seat.

3. A combined valve and drain, having in combination, a valve casing, a valve threaded thereinto to screw upon its seat, a valve stem attached to the valve, a hollow shank having a threaded connection with the valve stem and having a portion spaced therefrom, the said valve and stem being provided with a passageway that connects the valve chamber with the interior of the hollow shank, a packing ring on the end of the valve stem that tightly closes the interior of the hollow shank, said shank being provided with an opening in the side which lies against or to the outside of the packing ring when the valve is opened, but which travels to the inside of the packing ring by reason of relative movement of the shank and valve stem when the valve reaches its seat, and means on the end of the hollow shank for positively engaging the valve after the relative movement of the shank and valve has ceased, whereby the valve may be tightened upon its seat.

4. A combined valve and drain, having in combination, a valve casing, a valve threaded thereinto to screw upon its seat, a valve stem attached to the valve, a hollow shank having a threaded connection with the valve stem and provided with an inwardly projecting ring, a portion of the hollow shank being spaced from the valve stem, a packing ring to the outside of said inwardly projecting ring and located on the end of the valve stem, the said hollow shank being provided with an opening that lies against or to the outside of the packing ring when the valve is open and which travels to the inside of the packing ring by reason of relative movement between the hollow shank and the valve when the valve strikes its seat, the said inwardly projecting ring of the hollow shank acting as a seat for the packing ring when the valve is open and the said valve and stem being provided with a passageway that connects between the valve chamber and the interior of the hollow shank.

5. A combined valve and drain, having in combination, a valve casing, a valve threaded thereinto to screw upon its seat, a valve stem attached to the valve, a hollow shank that has a threaded connection with the valve stem, and a portion spaced from the valve stem, forming an annular space, the valve stem being provided with an end that fits tightly into the interior of the hollow shank, the said shank provided with an opening in the side that, when the valve is open, lies against or to the outside of the tightly fitting end of the valve stem but which travels to the inside of the said end after the valve strikes its seat and relative movement takes place between the hollow shank and the valve stem, and a nut provided with an annular recess and tightly connected with the valve casing, said annular recess being arranged to be about the opening in the shank when the opening gets to the inside of the tightly fitting end of the valve stem, the said valve and stem having a passageway connecting the valve chamber with the annular space between the hollow shank and the valve stem.

6. A combined valve and drain, having in combination, a valve casing, a valve threaded thereinto to screw upon its seat, a stem attached to the valve, a hollow shank having a threaded connection with the stem and a portion spaced from the valve stem, forming an annular space, a packing ring on the end of the valve stem fitting tightly upon the interior of the hollow shank, a cap nut threaded onto the end of the valve stem by threads of reverse pitch to the threads which connect the shank and the valve stem, the said valve and valve stem being provided with a passageway that leads from the valve chamber to the annular space between the hollow shank and the valve stem, the said hollow shank provided with an opening lying against or to the outside of the packing ring when the valve is open and traveling to the inside of the packing ring after the valve strikes its seat and relative movement between the hollow shank and the valve takes place.

7. A combined valve and drain, having in combination, a valve casing, a valve threaded thereinto to screw upon its seat, a valve stem attached to said valve, a hollow shank about the valve stem and having a portion spaced from the stem, said hollow shank being provided with a waste opening in its side, the said hollow shank and stem being adapted to frictionally engage to rotate together until the valve strikes its seat, when the shank and stem have relative movement, a packing member between the shank and stem in regard to which the waste opening moves to drain the delivery side of the valve chamber, when relative movement takes place, and a ring-like member on the shank below the packing member which engages with the packing member upon the turning of the shank to open the valve and thereby operatively connects the shank with the valve stem and also aids in cutting off the waste opening from the delivery side of the valve chamber.

In testimony whereof, I sign this specification in the presence of two witnesses.

DAVID A. LEAHY.

Witnesses:
ALBERT MAUCHE,
STUART C. BARNES.

Copies of this patent may be obtained for five cents each, by addressing the "Commissioner of Patents, Washington, D. C."